United States Patent [19]
Spencer et al.

[11] Patent Number: 5,596,915
[45] Date of Patent: Jan. 28, 1997

[54] METHOD AND APPARATUS FOR PRECISION DEGATING MECHANISM

[75] Inventors: Timothy F. Spencer; Gerald N. Walter, both of Rochester, N.Y.

[73] Assignee: Eastman Kodak Company, Rochester, N.Y.

[21] Appl. No.: 419,348

[22] Filed: Apr. 10, 1995

[51] Int. Cl.⁶ .............................. B26D 7/08; B26D 7/10
[52] U.S. Cl. .................................. 83/20; 83/171; 83/452; 83/623
[58] Field of Search ............................ 83/945, 20, 21, 83/914, 171, 457, 452, 623

[56] References Cited

U.S. PATENT DOCUMENTS

| | | | |
|---|---|---|---|
| 2,392,459 | 1/1946 | Casalino | 83/914 |
| 3,877,625 | 4/1975 | Brock | 225/2 |
| 3,919,375 | 11/1975 | Kontz et al. | 264/99 |
| 4,581,809 | 4/1986 | Soth | 83/945 |
| 4,585,152 | 4/1986 | Sager | 83/956 |

*Primary Examiner*—Kenneth E. Peterson
*Attorney, Agent, or Firm*—Susan L. Parulski

[57] ABSTRACT

A method and apparatus for degating plastic parts from a runner system wherein the parts are automatically and precisely positioned for accurate reproducible degating and pick-up.

16 Claims, 7 Drawing Sheets

METHOD AND APPARATUS FOR PRECISION DEGATING MECHANISM

FIELD OF THE INVENTION

The present invention relates to the processing of small parts; in particular, the degating of small plastic parts from a runner.

BACKGROUND OF THE INVENTION

With the advent of instrument miniaturization, the precision demanded of molded component parts continues to increase. To manufacture a small molded part produced to strict tolerances, (e.g. lenses used for small instruments such as arthroscopes, etc.) both the molding process and the separation of the part from the molded runner must be performed precisely. The process of separating parts from runners, known as degating, often introduces problems into the manufacturing process which rival the actual molding process in complexity. The problems are exacerbated when the parts are small in comparison to the size of the runner and gate system used.

Precise mechanical removal of molded parts from a runner, first requires the runner system and associated parts to be removed from the molding presses and cooled. Once cool, the part is desirably severed from the runner at the theoretical point where the mold gate connects to the component. The theoretical point is called the mold gate/part interface.

However, differences in runner cooling tend to cause random warpage of the runners to varying degrees. Since the runners are not uniform, it is difficult to set automated degating equipment without risking damage to the parts during degating. Attempts have been made to make warp free runners that are more uniform. However, it was found that runner warpage cannot be reduced without risking a commensurate increase to the part of material strain and stress.

Therefore, it is difficult to achieve a desirable uniformity in automated molding processes such that the parts severed from the runner are in finished form and nearly identical (within allowable tolerances). If the cut is made too close to the part, surface damage may occur on the piece. If the cut is too far from the part, excess gate material will be left still attached to the part. Further, it is difficult to locate the knives or other cutting surfaces to contact the area of the gate closest to the part during the cutting process. Still further, opposing knife edges may not meet precisely in point-to-point contact which results in damage to the cutting surfaces, or at least premature blade wear. Under such circumstances, a gate scar will result on the part which requires an additional trimming or polishing operation to achieve a precision cut tangent to the surface of the part. Processing accuracy is often important in many applications, but especially so in the field of precision optics where lens deviations as small as $\frac{1}{40}$ mm may adversely impact the part's usefulness and lead to waste and increased manufacturing cost.

Additional problems occur in degating parts from a runner system when the cutting surfaces are heated to assist in cutting thermal sensitive materials, such as plastics. Often the knives are heated, and the gate/part interface contacted by the heated cutting surface softens to a significant degree. If the severed part and the gate are left in close proximity to each other following cutting, the runner and severed part may readhere to one another.

Still further, as the runner or part (after cutting) is pulled away from a heated cutting surface, even an extremely clean cut may result in "stringers", or string-like tendrils of plastic being formed. Such stringers must then be trimmed from the part and cleaned off from the degating apparatus.

SUMMARY OF THE INVENTION

The present invention is directed to a method and apparatus for making a precise and clean cut at the gate/part interface without requiring further polishing or trimming. By practicing the present invention, the precision of the final cut position of the part on the runner is relatively independent of the dimensional uniformity of the parts or runners being cut.

Surface irregularities, nicks, scars or other cutting defects are eliminated by degating the parts from the runner with specially designed opposing heating knife blades which are restricted from overlapping due to integral knife stops which guarantee precise point-to-point contact. Such design prolongs the cutting life of the knife blades by minimizing knife blade wear.

Further, the present invention reliably captures the severed part in a clamping nest in a predetermined location thereby facilitating automated retrieval of the part, and automates the entire degating process.

According to the apparatus and method of the present invention, a runner with parts attached at a gate is brought into close association with a movable degating fixture. The fixture has a cutting nest to hold the part. The nest has an access passage throat through which the mold gate and part extend. The fixture also has a first and second cutting surface positioned on a first and second side of the mold gate/part interface. Positioning pins are engaged to contact the outer surface of the runner and supply force sufficient to flex the runner inwardly toward the movable degating fixture. The fixture is then moved in a direction to locate the part vertically over the nest. The runner and part are then vertically depressed into a cutting position with a clamping means; the part now being located in the nest. Further horizontal force is applied to the part in the nest by a clamp in a direction toward the access passage throat of the nest. This force assures that the part is held in the cutting position firmly during cutting. The two cutting surfaces are then engaged by a drive mechanism and brought toward each other and through the mold gate/part interface to a predetermined stop position. At the predetermined stop position, the cut has been completed with the part cleanly severed from the runner at the mold gate/part interface.

After the cut is made, the runner immediately flexes, or springs away, in a direction away from the nest and the severed part which is retained in the nest. This fast, springing action obviates the problem of producing "stringers" or allowing part/gate material to readhere. The severed part, still positioned in the nest in a predetermined position, is now located for automated pick-up. Such automated pick-up is preferably an automated robot arm or other automated mechanism as would be readily apparent to one skilled in the field. In this way, the degated part may be retrieved from a predictable location on the movable degating fixture regardless of the initial runner geometry and deformation (warpage).

BRIEF DESCRIPTION OF THE DRAWINGS

The accompanying drawings illustrate the invention. In such drawings.

DETAILED DESCRIPTION OF THE INVENTION

Figure 1:
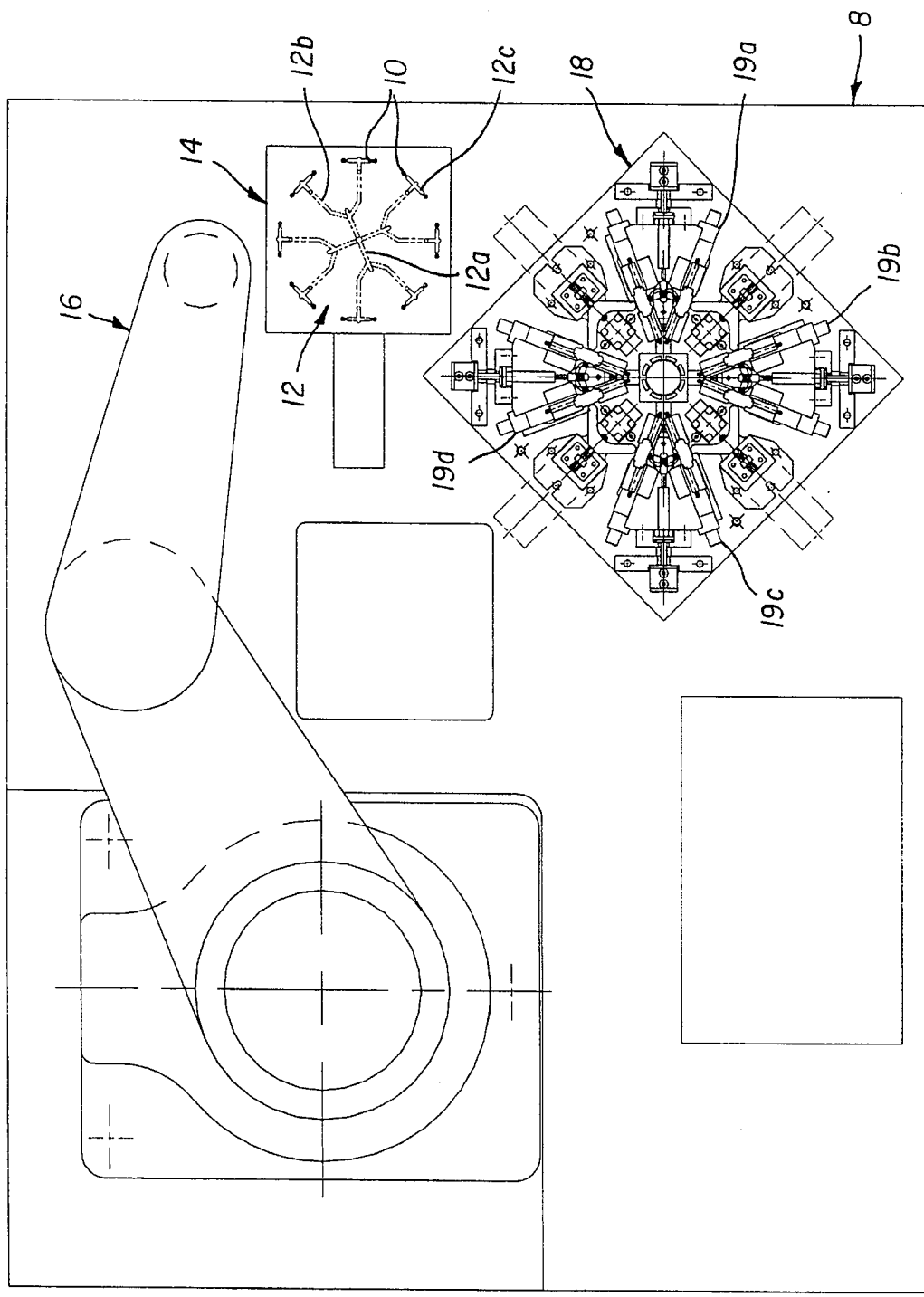
FIG. 1 is a plan view of the system.
Figure 3:
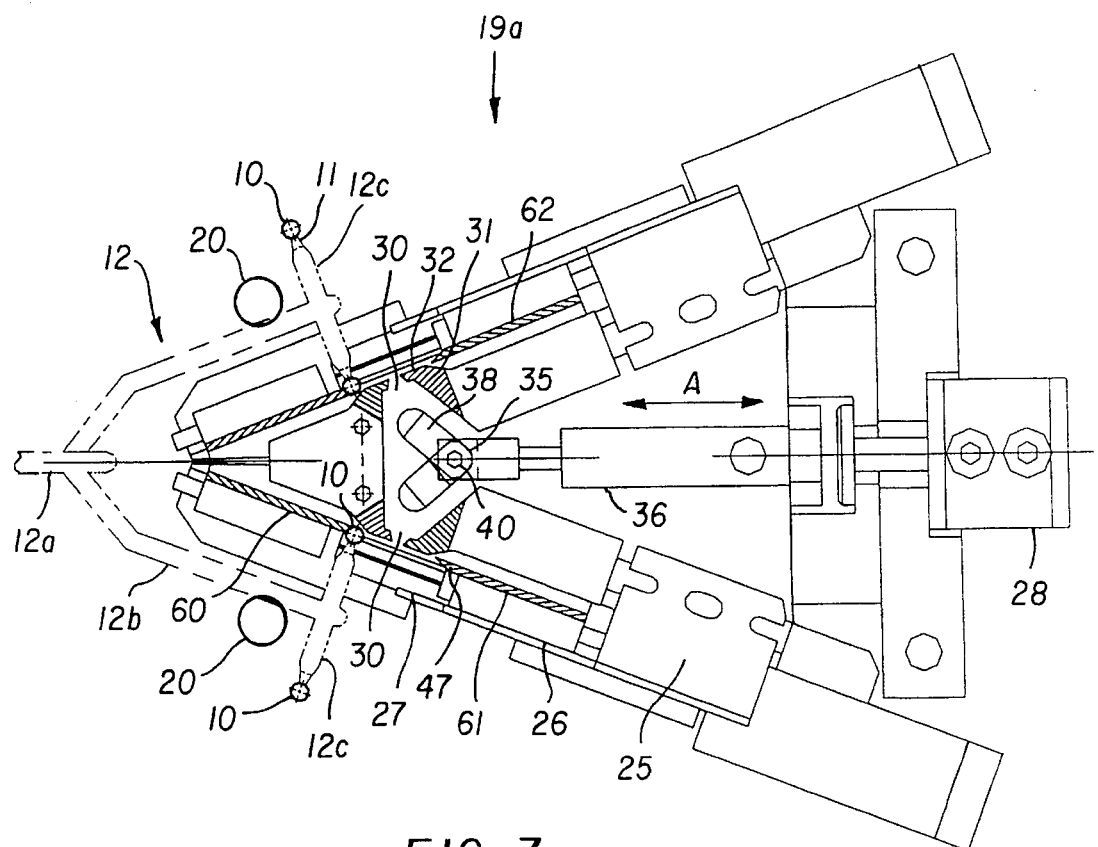
FIG. 3 is an enlarged plan view of one degating fixture.

The present invention will now be described in detail with reference to the drawings. FIG. 1 shows an overhead view of a work station 8 for degating precision parts from a runner system at the mold gate/part interface. A robot arm 16 is used to pick-up the runner 12 with parts 10 attached from the mold (not shown) in which the runner 12 was molded. The runner 12 is placed on a chill plate 14 which may be maintained at or below ambient temperature to cool the molded runner 12. The runner 12 has a trunk section 12a, from which extend branched legs 12b, which further extend to the terminal T-sections 12c. The mold gates 11 (see FIG. 3) are located at the end of the T-section 12c of the runner 12. Each mold gate 11 is attached to a part 10 as shown in FIG. 3. The degating station 18 contains four degating fixtures 19a–19d.

Figure 2:
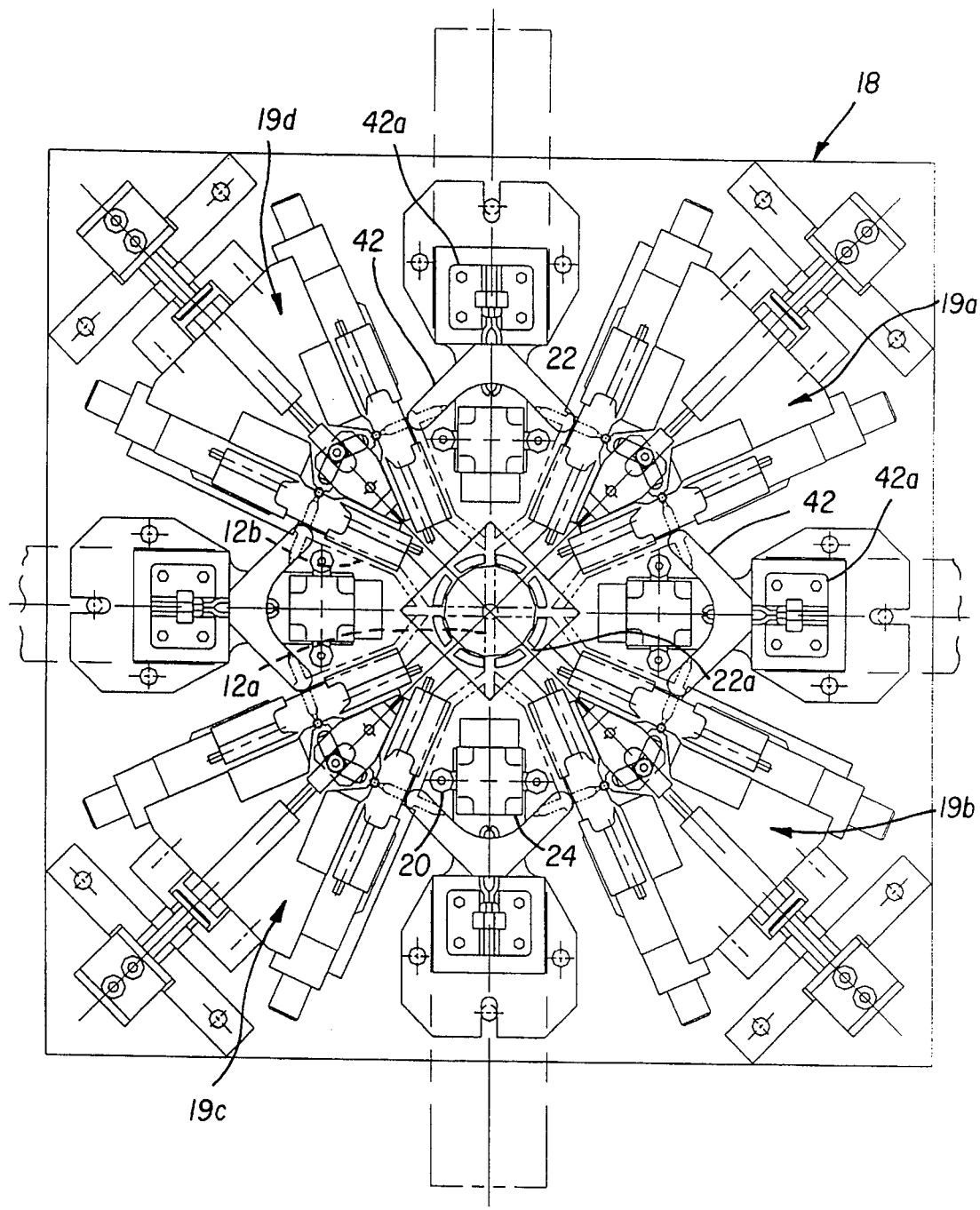
FIG. 2 is a plan view of the degating station.

FIG. 2 shows the degating station 18 and the four degating fixtures 19a–19d. The center of the degating station 18 has a central spindle 22. The central spindle 22 is firmly attached to, and extends vertically from (and perpendicular to) the base of the degating station 18. The spindle 22 has a series of openings 22a onto which the trunk section 12a of the runner 12 is placed. The branched legs 12b of the runner 12 are positioned to fit between the degating fixtures 19a–19d and the positioning pins 20. The degating station 18 has eight positioning pins 20. The positioning pins 20 extend vertically and perpendicularly from the horizontal plane of the degating station 18. Toggle clamps 42 shown in their "down" or holding position are firmly attached to the degating fixtures 19a–d by fastening means, which are preferably brackets 42a.

Figure 5:
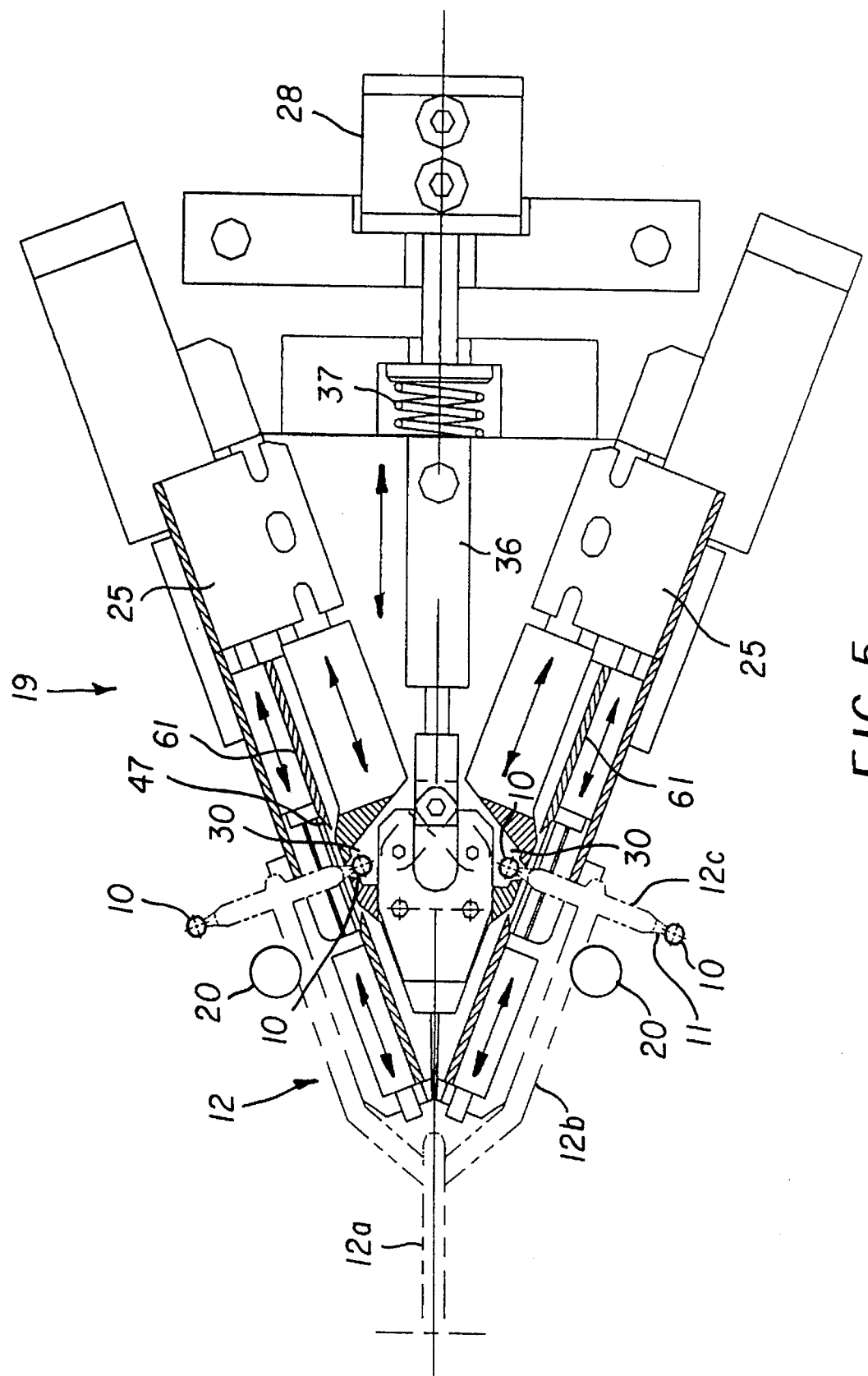
FIG. 5 is a plan view of the degating fixture in the cutting position (knives open)

With reference to FIG. 3, the part 10 is attached to the T-section 12c of the runner 12 at the gate 11. The runner 12 is positioned at a height of from about 1 to about 2 cm above the degating fixture, but could be positioned at any desired height as would be readily apparent to one skilled in the field. The degating fixture 19a is movable in the direction of the arrow "A" for a distance which is not critical, but which is preferably a maximum distance of about 5 cm. Locating brackets 25 are firmly attached to the degating fixture 19a by a fastening means (not shown). The locating brackets 25 have an elongated section 26 extending in the direction of the runner 12. The locating bracket tip 27 is designed to contact the "T"-section 12c of the runner 12. A drive mechanism 28 which may be, for example, spring-loaded with a spring 37 as shown in FIG. 5, engages the degating fixture 19a automatically and moves the fixture toward the runner 12 until the tip 27 of the locating bracket 25 impacts the "T"-section 12c of the runner. The fixture 19a has two nests 30 surrounded by retainers 31 which taper to opposing nest lips 32 and leave an access passage throat 33. A cam clamp assembly 35 is located relatively equidistant between the two nests 30. The cam clamp assembly 35 is connected to an actuating cylinder 36 which is a part of degating fixture 19a. The cam clamp assembly 35 has two heads 38 attached at pivot point 40. A pair of knife blades 60,61 having sharpened cutting surfaces are located in close proximity to each nest 30.

Figure 4:
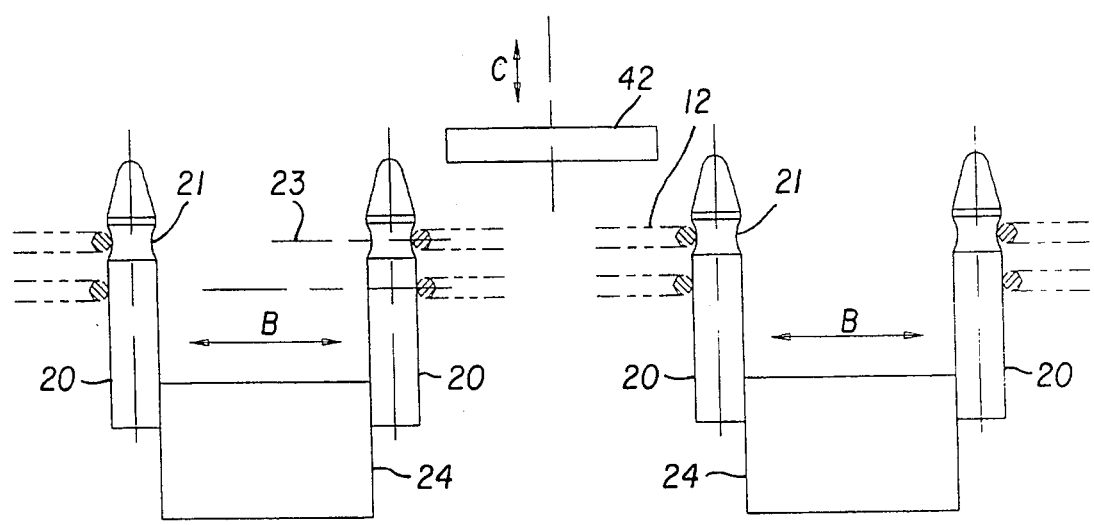
FIG. 4 is an elevation view of the positioning pins.

As shown in FIG. 4 each positioning pin 20 has a shallow groove 21. The shallow groove 21 retains the runners which may be of varying diameters inside the groove. The runner 12 is held in the holding position 23 at a height above the degating fixture 19a as disclosed above. The pins are connected to a gripper mechanism 24 which is activated by a drive means (not shown) as would be understood by one skilled in the field, to extend the pins in a direction outward, and away from one another as indicated by arrow "B". The gripper mechanism 24 is preferably a PHD parallel gripper 190 series (PHD, Fort Wayne, Ind.). The runner is depressed to a cutting position 23a by means of a toggle clamp 42 which moves in the vertical axis in the direction of arrow "C", and which is firmly attached to each degating fixture by brackets 42a as shown at FIG. 2. The runner 12 depressed such that part fits into the nest 30 as shown in FIG. 5. The pins 20 can be retracted to their original starting position.

Figure 6:
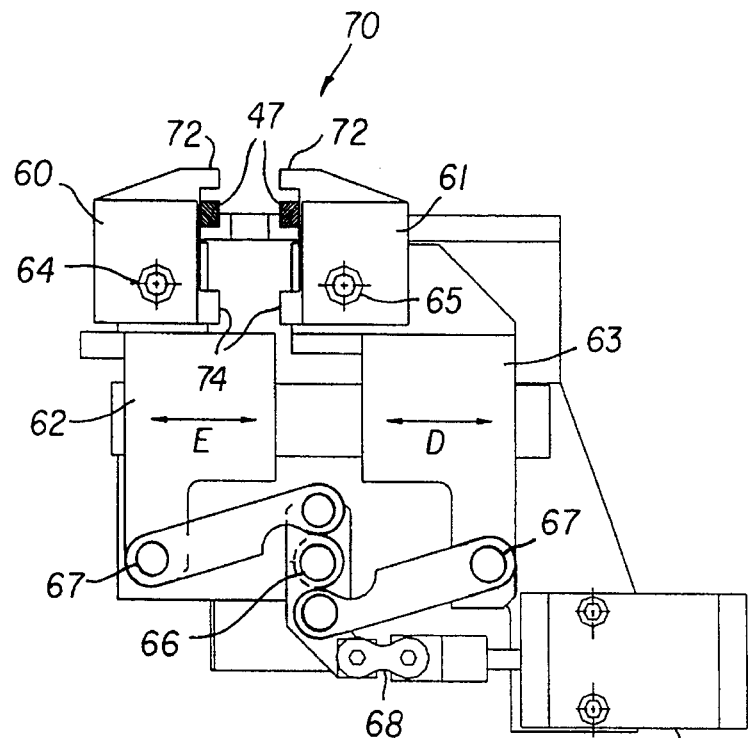
FIG. 6 is an elevation view of the cutting mechanism (open position)
Figure 7:
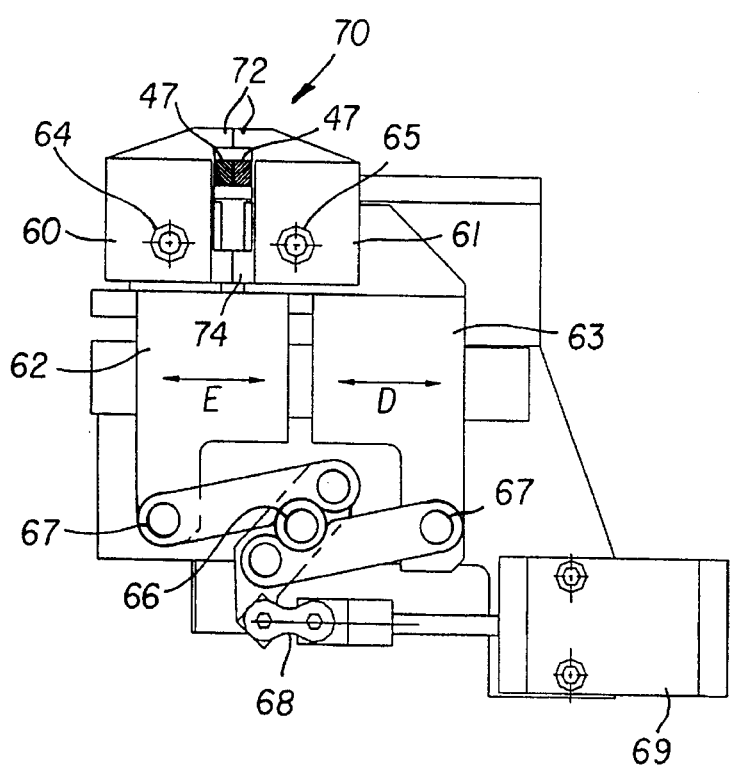
FIG. 7 is an elevation view of the cutting mechanism (closed position)

FIGS. 6 and 7 show the preferred knife blanks 60 and 61, each of which is fastened to movable blocks 62, 63 by fastening screws 64, 65 such as screws or other fastening means as would be readily apparent to one skilled in the field. The blocks 62, 63 move closer to, and away from each other laterally in the direction as indicated by arrows "D" and "E". The blocks are attached to a reciprocating or pivot mechanism 66 which is attached by fastening pins 67 to a connecting link 68 that is attached to an actuating cylinder 69 which is pneumatically, hydraulically or otherwise mechanically driven with enough force applied to the cutting mechanism 70 to degate the parts as desired, as would be readily apparent to one skilled in the field. The knives 60,61 have sharpened blade edges 47 and integral upper blade stops 72 and lower blade stops 74. FIG. 6 shows the preferred cutting mechanism 70 in the open position ready to accept the part and runner system (not shown). FIG. 7 shows the cutting mechanism 70 in the closed position. The sharpened blade edges 47 would preferably meet at the center of the gate 11/part 10 (as shown in FIG. 3) interface within a tolerance of about 1/40 mm, resulting in the part 10 being severed from the runner 12.

Any stock cutting mechanism having opposed cutting surfaces may be used in the apparatus of the present invention. However, to precisely cut small plastic parts the preferred cutting mechanism shown in FIGS. 6 and 7 has two opposing knives 60,61 which have opposing cutting edges 47 located between upper 72 and lower 74 integral blade stops. In this way, as the two opposing knife edges are brought together and cut through the interpositioned part, the opposing integral upper 72 and lower 74 integral blade stops eventually contact each other. At this point, the blade surfaces 47 of the two opposing knife blanks 60 and 61 are at the precise point of meeting (point-to-point contact). The integral upper and lower blade stops inhibit the blades from moving any closer to, or nicking each other's cutting surface. This preferred design results in a clean cut on the part with reduced chance of gate scarring or blade overlap. In an especially preferred embodiment, the cutting surfaces of the knife blades meet to create an angle of about 180 degrees across the area of the joined blades closest to the part.

In another embodiment, one cutting surface could be used in concert with an opposing anvil being specially designed to fit snugly against one side of the part being severed. In this way, the one blade and the anvil would be moved closer toward each other, from opposite sides of the interpositioned part, until the part is severed from the runner. It is understood that either the anvil or the blade may also be maintained in a fixed position while remaining blade or anvil respectively is moved to effect the cut.

Figure 8:
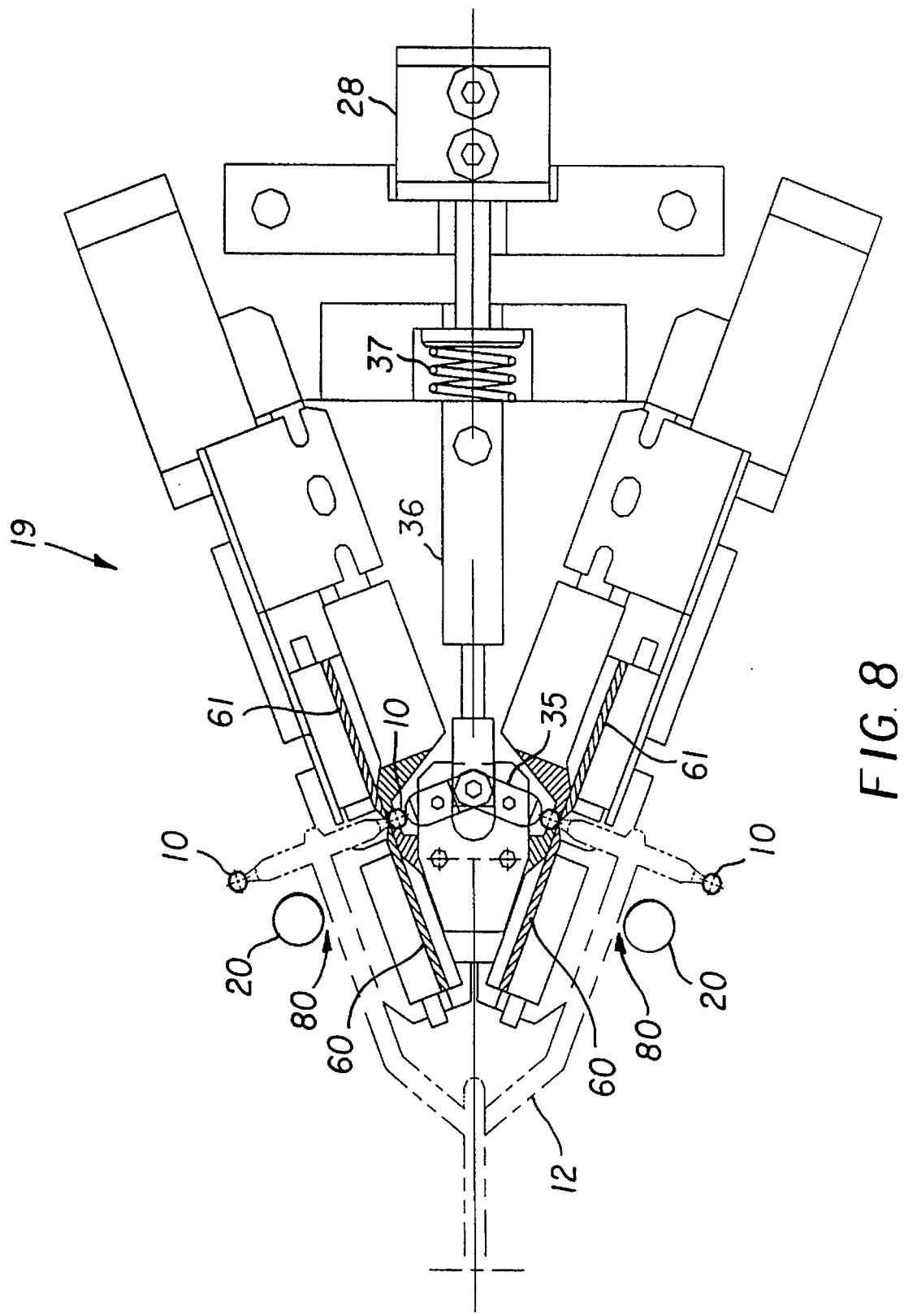
FIG. 8 is a plan view of the degating fixture during cutting (knives closed)
Figure 9:
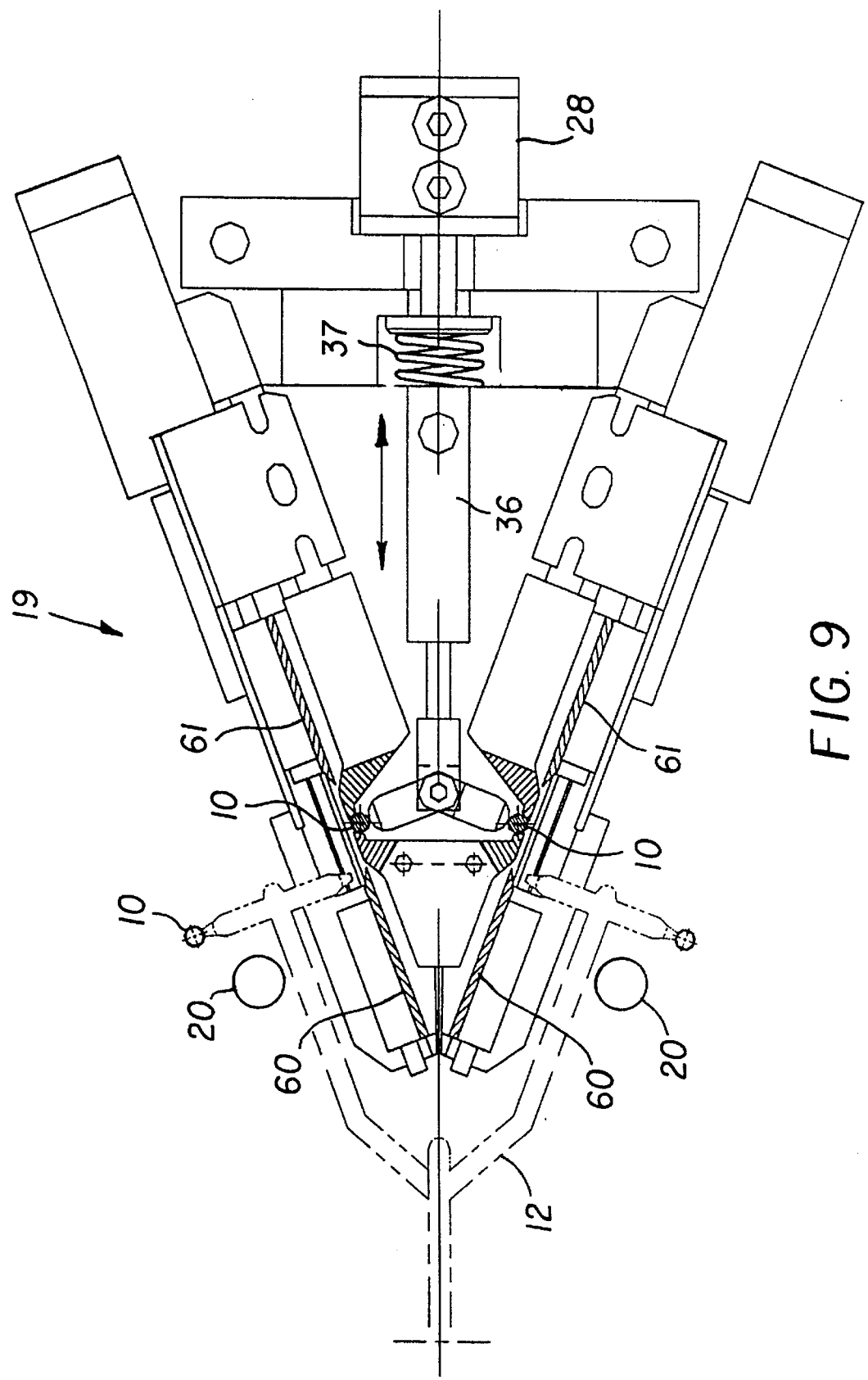
FIG. 9 is a plan view of the degating fixture after cutting in the part pick-up position.

In operation, the four degating fixtures 19a–19d will work in concert. The operation which is described with regard to one fixture can take place simultaneously with all four fixtures. As shown in FIGS. 1 and 2, an automatically controlled robot arm 16 will pick a runner from an opened mold. The robot will place the runner on a chill plate for a sufficient cooling time. The size and geometry of the runner 12 will vary due to uneven shrinkage during the cooling process. The robotic arm then picks up the runner 12 with parts 10 attached, and places the runner 12 over the central spindle 22 and positioning pins 20. The actuating cylinder is then automatically and pneumatically engaged, as will be readily understood, to move the degating fixture 19a in a forward direction toward the runner 12 which is held in position at a height of from about 1 to about 2 cm above the degating fixture 19a. The exact height, however, is not critical. The runner 12 must be at a height above the fixtures to allow the fixtures to movably slide beneath the stationary and suspended runner 12. The runner 12 will be contacted in this suspended position at the T-section 12c of the runner 12 by the tip 27 of the elongated section 26 of the locating bracket 25. The tip 27 is dimensioned to contact the T-section 12c of the runner 12 in both the holding 23 and cutting positions 23a. Therefore, to keep the width of the tip 27 to a reasonable width, the ideal distance at which the runner 12 is suspended above the fixtures 19a–d by the central spindle 22 and the pins 12 is only from about 1 to about 2 cm. The tip 27 of the locating bracket 25 will contact the "T" section 12c of the runner 12, impeding further forward motion of the degating fixture 19a. At this point, the part 10 to be severed at the mold gate/part interface is positioned above and outside of the access passage throat 33 of the nest 30. The mold gate/part interface is understood to be the precise point where the part 10 joins the gate 11. The positioning pins 20 are then engaged by the gripper mechanism 24 which exerts outward force on the pins 20. The pins 20 move out from the gripper mechanism 24 a distance of less than about 1 cm, preferably from about 0.1 to about 1 cm. The pins 20 thus flex the runner legs 12 a distance sufficient to align the part 10 attached to the runner 12, directly over the nest 30. See FIG. 5. As shown in FIGS. 2 and 4, toggle clamps 42 are lowered into position and contact the T-section 12c of the runner 12 from above the runner 12 and force the runner 12 from the holding position 23 to the cutting position 23a. Any clamping mechanism which may be lowered onto and off from the T-section 12c of the runner 12, as would be understood by those in the field, may be used. As shown in FIG. 5, in the cutting position 23a, the part 10 is located inside the nest 30. The pins 20 are in contact with the runner 12. As shown in FIG. 8, once the part 10 is located within the nest, the positioning pins 20 are retracted to their original position, and no longer are in contact with the runner 12 as evidenced by the gap 80 now present between the pins 20 and the runner legs 12 shown in FIG. 8. The natural flexing property of the runner leg 12 creates a force in a direction out of the access passage throat 33 of the nest and toward the pin 20. The flexing force assists in locating the part 10 in the nest such that it contacts the nest lips. To further secure the proper position of the part 10 within the nest, and to insure sufficient resistive force on the part 10 during the degating, cam clamps 35 are actuated hydraulically, via mechanical spring force, or pneumatically, forcing the clamp heads 38 against the parts 10. The specific cam clamp mechanism selected is not critical. The part 10 is now positioned in the cutting position; equidistant between the two opposing knife blades 60,61, which are preferably heated. The knife blades 60,61 are attached to a levered block mechanism 62, 63 and engaged (see FIGS. 6 and 7). As shown in FIG. 8, the heated blades 60,61 are brought together with force sufficient to quickly and cleanly cut the part 10 free from the runner 12 at the gate 11. As the cut is completed, the flexing action of the runner 12 allows the severed runner 12 to spring away from the severed part 10 which is retained in the nest. The heated knives 60,61 optionally move synchronously toward one another and close tightly, preferably with pneumatically controlled force and speed. In a preferred embodiment, the fixture 19a may then be moved mechanically back to the position as shown in FIG. 9. The robot arm 16 then picks up the severed part 10 from the nest 30. It may not be critical for the fixture 19a to move back to the "starting" position. It is understood that the robot arm 16 may be programmed to pick up the severed part 10 from the nest 30 at any position as may be desired.

The quick springing action of the severed runner 12 from the part 10 eliminates the opportunity for readhesion of the part 10 and runner 12, or the appearance of "stringers" after cutting. After the degating or cutting, the toggle clamp 42 is raised and the degating fixture 19a (with the parts 10 still clamped into place in the nest 30 via clamp heads 38) is moved back to a predetermined and fixed location thereby locating the part 10 precisely in three dimensions. The robotic manipulator 16 which initially presented the runner 12 to the degating fixtures 19a–d, returns to grip both the runner 12 and the degated parts 10, which are now removed from the degating fixtures 19a–d. Depending upon the configuration of the runner 12 and parts 10, in a preferred embodiment the runner 12 may be lifted off from the central spindle 22, rotated a given number of degrees, and lowered onto different openings 23 of the spindle 22 to present a second set of parts 10 to the degating fixture 19 for removal. This rotation is desired for the runner configuration shown in the figures, since a part 10 is attached to both ends of the T-section 12c at the terminal ends of the runner 12, as would be apparent to one skilled in the field.

An air activated mechanism, preferably an air cylinder, is used to supply the low pressure required to move the degating fixture into cutting position. However, the force may be supplied by any suitable means such as hydraulic, electrical, etc. as would be readily apparent to one skilled in the field. This position will be variable, and light pressure may also be maintained by a spring 37 (see FIG. 5) which is in line with the actuating cylinder 28. This pressure locates the fixture 19a in the final cutting position, relative to the parts 10. It is not critical whether the fixture is oriented into position beneath the parts 10 before or after the runner legs 12 are flexed by the pins 20.

In FIGS. 7 and 8, the cutting position of the part 10 is firmly established as clamping arms (not shown, but 42 in FIG. 2) are vertically disposed down upon the T-section 12c of the runner legs 12b located immediately adjacent to the parts 10. The clamp 42 shown in FIG. 2 may be any clamping means as would be readily understood by one skilled in the field, but is preferably a toggle clamp sold commercially under the name DE-STA-CO Model 812 (DE-STA-CO, Troy, Mich. 48007). The toggle clamp 42 is located adjacent legs 12c of the runner 12, forcing the two adjacent legs down simultaneously. This gives the parts 10 a precise position in the vertical plane, while the nest 30 and horizontal cam clamp heads 38 precisely position the part 10 in the horizontal plane.

It is understood that the present apparatus and methods may be used to cut parts from runners made from a wide range of materials including plastics. The plastic may be either thermoset or thermoplastic in structure. Particularly preferred plastics for use in molding small optical components are styrenes and acrylics.

PARTS LIST

| 8 | work station | 28 | drive mechanism |
|---|---|---|---|
| 10 | part | 30 | nest |
| 11 | gate | 31 | retaining finger |
| 12 | runner | 32 | retaining lip |
| 12a | trunk (runner) | 33 | access passage |
| 12b | branched legs (runner) throat | 35 | cam clamp assembly |
| 12c | T-section (runner) | 36 | actuating cylinder |
| 14 | chill plate | 37 | spring |
| 16 | robot arm | 38 | cam clamp heads |
| 18 | degating station | 40 | pivot point |
| 19a–19d | degating fixtures | 42 | toggle clamp |
| 20 | positioning pins | 42a | bracket |
| 21 | pin grove | | |
| 22 | central spindle | 47 | knife blade edge |
| 22a | spindle opening | 60,61 | knife blades |
| 23 | holding position | 62,63 | movable blocks |
| 23a | cutting position | 64–65 | fastening screws |
| 24 | gripper mechanism | 66 | pivot mechanism |
| 25 | locating bracket | 67 | fastening pin |
| 26 | elongated section (of bracket) | 68 | connecting link |
| | | 69 | actuating cylinder |
| 27 | tip of bracket | 70 | cutting mechanism |
| | | 72 | upper blade stops |
| | | 74 | lower blade stops |
| | | 80 | gap |

Many other modifications and variations of the present invention are possible to the skilled practitioner in the field in light of the teachings herein. It is therefore understood that, within the scope of the claims, the present invention can be practiced other than as herein specifically described.

We claim:

1. A method of severing a molded part from a runner at a mold gate/part interface comprising:

bringing the runner having molded parts attached at a gate region into close association with a movable degating fixture having a cutting nest to hold the part, the nest having an access passage throat through which the mold gate and part extend and having a first and second opposing cutting edges positioned on a first and second side of the mold gate/part interface;

engaging positioning pins to contact an outer surface of the runner and supplying force sufficient to flex the runner inwardly toward the movable degating fixture;

moving the degating fixture in a direction to locate the part vertically over the nest;

engaging a first clamp to vertically clamp the part in the nest;

engaging a second clamp to supply horizontal force to further orient the part in the nest;

engaging said cutting edges such that the edges are brought into motion toward each other and through the mold gate/part interface to a predetermined stop position; and cleanly severing the part from the runner.

2. The method of claim 1 further comprising the step of retrieving the severed part from a predictable location in the nest through a repeatably automated means.

3. The method of claim 2 wherein the automated means is an automated robot arm.

4. The method of claim 1 wherein the cutting edges are heated.

5. The method of claim 1 wherein the cutting edges have integral knife stops to insure contact of the opposed cutting edges.

6. The method of claim 1 wherein the part is made from a thermoplastic material.

7. The method of claim 1 wherein the part is made from a thermoset material.

8. The method of claim 1 wherein the cutting edges are beveled knife blades, said knife blades meeting to create an angle of about 180 degrees across the area of the joined blades closest to the part.

9. An apparatus for severing a molded part from a runner at a mold gate/part interface comprising:

a means for bringing the runner having parts attached at a mold gate into close association with a movable degating fixture having a nest for the part to be severed while said part is attached to said runner, the nest having an access passage throat through which the mold gate and part extend;

a means for engaging positioning pins to contact an outer surface of the runner;

a means for moving the positioning pins in a direction such that force is applied to the runner and the runner is flexed against the fixture to a predetermined position with the mold gate/part interface positioned above the access passage throat and the part positioned above the nest;

a means for depressing the runner and part to a height such that the part rests inside the nest with the mold gate/part interface located at the access passage throat;

a means for locating a first and second opposed cutting edges positioned on a first and second side of the gate; and a means for engaging said first and second cutting edges such that the cutting edges are brought into motion toward each other and through the mold gate/part interface to a predetermined stop position such that the part is cleanly severed from the runner.

10. An apparatus for severing a molded part from a runner at a mold gate/part interface comprising:

an automated mechanism for bringing the runner having parts attached at a mold gate into close association with a movable degating fixture having a nest for the part, the nest having an access passage throat through which a portion of the mold gate and part extend and having a first and second opposing heated cutting edges positioned on a first and second side of the mold gate;

a gripper for engaging positioning pins to an outer surface of the runner causing the runners to be flexed;

a drive mechanism for moving the degating fixture in a direction to locate the part vertically over the nest;

a first clamp for vertically depressing the runner into a cutting position and orienting the part in the nest;

a second clamp for supplying horizontal force to orient the part against the access passage throat in the nest; and a two-bladed cutting mechanism for moving said first and second opposing cutting edges toward each other and through the mold gate/part interface to a predetermined stop position to cleanly sever the part from the runner.

11. The apparatus of claim 10 wherein the cutting edges are beveled knife blades, said knife blades meeting to create an angle of about 180 degrees across the area of the joined blades closest to the part.

12. The apparatus of claim 10 wherein the automated mechanism is a robot arm.

13. The apparatus of claim 10 wherein the cutting edges are heated.

14. The apparatus of claim 10 wherein the cutting edges have integral knife stops to insure contact of the opposed cutting edges.

15. The apparatus of claim 10 wherein the part is made from a thermoplastic material.

16. The apparatus of claim 10 wherein the part is made from a thermoset material.

* * * * *